Figure 1:
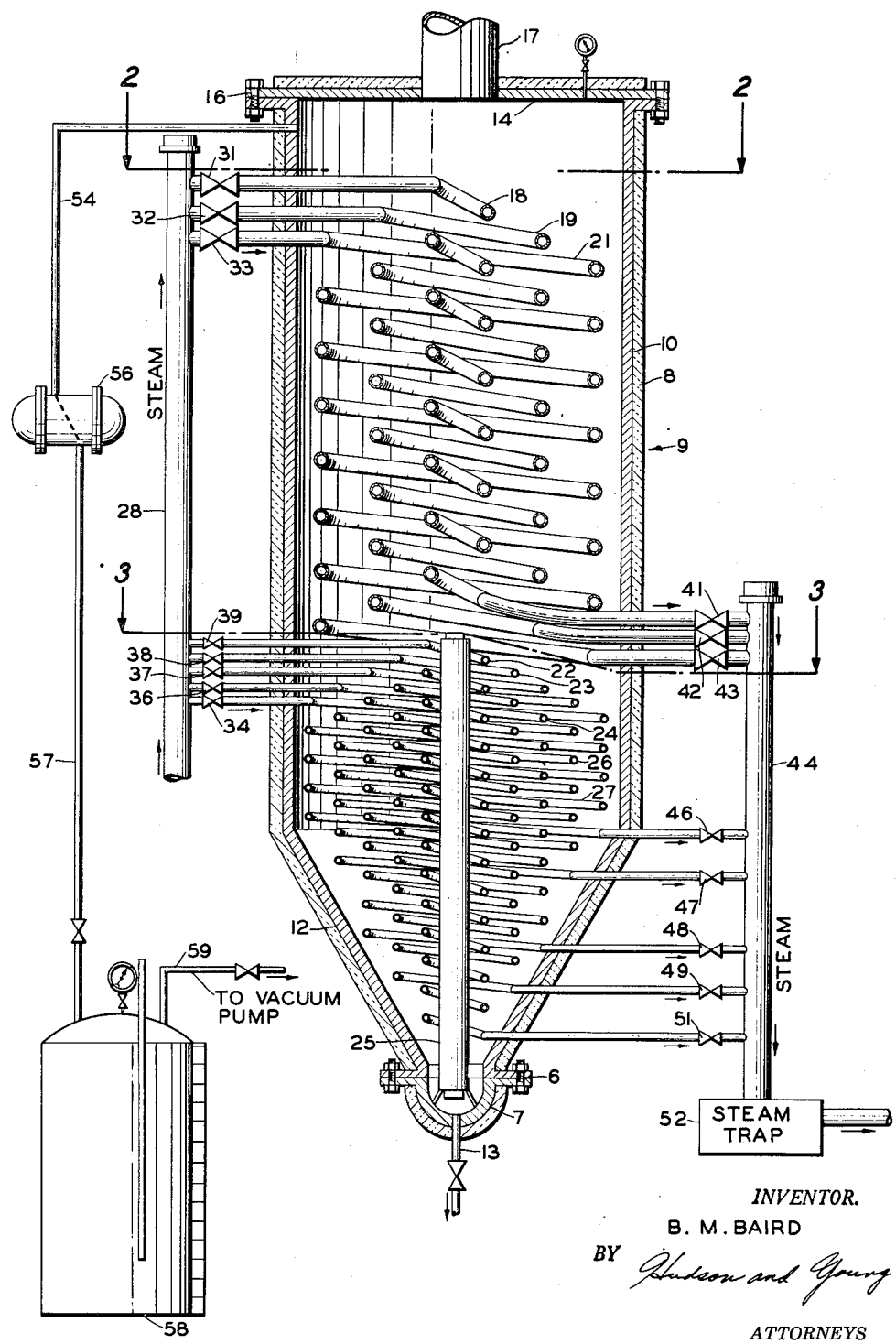

June 26, 1951  B. M. BAIRD  2,558,206

PROCESS AND APPARATUS FOR DRYING HYDROGEL

Filed Dec. 6, 1948  2 Sheets-Sheet 2

INVENTOR.
B. M. BAIRD
BY *Hudson and Young*
ATTORNEYS

Patented June 26, 1951

2,558,206

UNITED STATES PATENT OFFICE 2,558,206

PROCESS AND APPARATUS FOR DRYING HYDROGEL

Bruce M. Baird, Phillips, Tex., assignor to Phillips Petroleum Company, a corporation of Delaware Application December 6, 1948, Serial No. 63,665

9 Claims. (Cl. 34—39)

This invention relates to a method and to an apparatus for drying hydrogels. In one aspect it relates to a method and apparatus for the controlled drying of hydrogels which will produce materials having desirable catalytic properties as contact masses or as catalyst components. The invention also relates to catalyst preparation.

In the manufacture of hard, porous, silica-gel, or other gels of a similar nature, such as gels of oxides of tin, aluminum, tungsten, and titanium, an intermediate is formed which consists of a jelly-like mass containing a large amount of water, and this intermediate product is called a hydrogel.

In the production of inorganic gels, such as silica-gel, it is customary to mix solutions of reactants together so that they may set in a relatively voluminous hydrogel form, after which the hydrogel is dried beyond a critical point at which it loses its hydrogel characteristics and assumes the form of relatively dry, discrete porous particles which will not revert to the hydrogel on subsequent wetting, and which are referred to herein as gel product. The drying operation normally is accompanied by a substantial shrinkage of the hydrogel so that the final gel product is of much smaller volume than the initial hydrogel.

In the preparation of a gel type catalyst, an acid hydrogel, such as silica-gel, is prepared, and before it is thoroughly dried or dehydrated, it is treated with an aqueous solution of a suitable metal salt. Silica-gel type catalysts, for example, are generally prepared by first forming a hydrous silica-gel by adding an aqueous solution of an alkali metal silicate to a stoichiometric excess of an aqueous solution of an acid, allowing the resulting acid solution or sol to set to a gel, washing soluble material from the gel, treating or activating the gel with an aqueous solution of a suitable metal salt, and subsequently washing and drying the treated material. In this manner, a part of the metal, presumably in the form of a hydrous oxide or loose hydroxide compound formed by hydrolysis, is selectively adsorbed by the hydrous silica, and is not removed by subsequent washing. The most often used catalyst of this type, at present, is a silica-alumina catalyst prepared by treating a wet or partially dried silica hydrogel, so prepared, with an aluminum salt solution and subsequently washing and drying the treated material. However, catalysts of a very similar nature, but differing among themselves as to one or more specific properties, may be prepared by using, instead of an aluminum salt, a hydrolyzable salt of a metal selected from group III B or from group IV A of the periodic system and may be referred to in general as "silica-alumina type" catalysts or silica-metal oxide catalysts. As listed in "Modern Inorganic Chemistry" by J. W. Mellor (Longmans, Green & Co. (1939), revised and edited by G. D. Parkes) on page 118 group III B consists of boron, aluminum, gallium, indium and thallium, and group IV A consists of titanium, zirconium, hafnium and thorium. More particularly, salts of indium and thallium, in addition to aluminum in group III B may be used, and salts of titanium, zirconium and thorium in group IV A may be used to silica gel and to prepare catalysts of this general type. Boron in the form of boric acid, or a soluble borate, such as sodium borate, may also be incorporated with silica gel. The catalysts so prepared are useful in processes for the polymerization of unsaturated organic compounds, especially for the polymerization of low-boiling olefin hydrocarbons in either gaseous or liquid phase, for the depolymerization of higher-boiling polymers, for the cracking and splitting of higher-boiling hydrocarbons to form lower-boiling hydrocarbons, for the isomerization of various hydrocarbons, for the hydrolysis of alkyl and aryl halides at elevated temperatures, for the addition of certain halogens and hydrogen halides to unsaturated compounds, for the splitting out of a hydrogen halide from an alkyl halide, and the like. Whether prepared by this method or by some modification thereof, the catalyst will contain a major portion of silica, and a minor portion of an oxide, as defined hereinabove. The minor portion of metal oxide, such as alumina, will generally not be in excess of 10 per cent by weight, and will more often, and generally more preferably, be between about 0.1 and 1.5 or 2 per cent by weight, of the total oxides on a dry basis.

In preparing a silicic acid gel, a solution of a silicate is added to a dilute solution of a mineral acid. A wide range of concentrations of the constituents is permissible although in actual practice it has been found desirable to use a volume of dilute acid approximately equal to the volume of dilute silicate solution. The resulting mixture preferably should have a pH somewhat on the acid side. The mixture generally sets to a gel in about 2 to 12 hours, but the time required for setting in any particular case will vary with and will depend upon the concentration of the constituents, and upon the temperature of the mixture, etc., as is known to the art. After the gel has set, it is allowed to age for a time usually between four and twenty-four hours. After aging, it is broken into pieces and washed to remove excess salt or acid. Forcing the material through a screen with holes about one inch in diameter is generally satisfactory. The time required for washing will vary with the size of the batch being washed. This wet material is dried until it occupies only a relatively small per cent of its original volume, usually between 15 and 25 per cent. The material thus dried is sufficiently dry and hard so as to be comparatively easy to chip with the fingernail. Generally the partially dried material is washed again. The gel need not be dried after the second washing but is ready for activation. This is brought about by treating the gel with a more or less dilute solution of a hydrolizable salt, as already discussed.

The activation treatment is primarily effected by contacting the silica gel with a solution of the desired salt. It may be accompanied by heating to a more or less elevated temperature by indirect heat exchange or direct injection of steam, or the like; by agitation of the mixture of solution and granular gel; by passing a stream of the treating solution through a stationary or moving bed of granular material, and by other similar mechanical manipulation. While it is not necessary to heat the mixture during treatment, the period of activation may be materially shortened by the use of an elevated temperature. Generally, the temperature need not be above the ordinary boiling temperature of the treating solution, but higher temperatures may at times be used by conducting the treatment in a closed vessel under a suitable superatmospheric pressure.

The activating solution is removed and the treated gel is washed. If desired, a second activating operation may be employed. The activated gel is then washed and dried. Such a preparation is described in more detail in Hendrix and Chapman 2,342,196, issued February 22, 1944, and in Hachmuth 2,349,904, issued May 30, 1944.

An important step in a catalyst preparation method of the type above described is that of uniformly drying the jelly-like mass of hydrogel. Non-uniform drying results in the formation of sub-active catalysts from a hydrogel which has been either over-dried or under-dried, or parts of which have been either excessively or insufficiently dried. Over-drying the hydrogel results in reducing the surface area of the hydrogel which leads to the formation of a gel catalyst of low activity. Under-drying results in a deficiency in the pore space of the hydrogel to be activated, and likewise contributes directly to the formation of a gel catalyst of low activity. Consequently, it is essential that the hydrogel be uniformly dried to the required extent to assure the formation of a gel-type catalyst of maximum activity. Numerous methods for drying hydrogels have been disclosed by workers in the art. In accordance with one general drying method, a stream of heated air is passed through a bed of hydrogel usually disposed in tray-supported layers. Such procedure is generally well known to result in a mass of granular hydrogel containing over-dried and/or under-dried portions, and in any case, an un-uniformly dried material. Other known drying methods include drying the hydrogel under various conditions of pressure and temperature, and various multiple stage processes employing various combinations of heating, and pressurizing, and the like. In the practice of these known processes, over-drying and under-drying of the gel frequently occurs and an un-uniformly dried hydrogel is thereby produced.

The principal feature of this invention is to provide method and apparatus for removing most of the water from the hydrogel, whereby the time required for this dehydration stage is considerably shortened, the cost of operation reduced, a more uniformly dried product is produced, and the output of the plant increased. This invention is concerned with uniformly drying a hydrogel whereby over-drying and under-drying is substantially prevented, and by means of which a highly active gel type catalyst may be produced.

One object of this invention is to prepare a dried hydrogel.

Another object is to provide a method for drying a hydrogel.

Another object is to provide an apparatus in which a hydrogel may be dried.

Another object of this invention is to provide a novel method and apparatus for drying a hydrogel whereby the hydrogel is uniformly dried.

Another object is to provide a method and apparatus for drying a hydrogel which upon being activated forms a gel type catalyst of high and improved activity.

Other objects will be apparent to those skilled in the art from the accompanying discussion and disclosure.

In accordance with the present invention, a method and apparatus is presented which effectively dries hydrogels, such as silica gel, under carefully controlled conditions and at the same time avoids over-drying and/or under-drying, and provides a product which possesses high porosity and strength, which forms a minimum of fines, and which may be activated to produce a gel type catalyst of improved high activity.

In the practice of my invention a hydrogel is dried in an enclosed drying zone in an atmosphere of water vapor and in the absence of air, or any vapor stream, other than water. Drying temperatures are preferably from 300 to 400° F., although temperatures as low as 200° F. or lower may be employed with concomintantly longer required drying times. The operating pressure is one atmosphere or less, preferably from 18" to 24" vacuum. I have found in the practice of my invention that, although a silica hydrogel is dried when from 80 to 85 per cent of its weight in water has been removed, the best quality silica gel is obtained when from 82 to 83 per cent by weight of water has been removed. When just 80 per cent or slightly less by weight of water has been removed from the hydrogel, a portion of the gel is under-dried, while with the removal of over 85 per cent by weight of water, a portion of the gel is over-dried.

Dried silica gel, produced by my process, may be activated to produce a superior silica-gel catalyst such as, for example, a silica-alumina polymerization catalyst. Such a silica-alumina catalyst prepared when employing the drying process of my invention has shown an activity in excess of 180 per cent of the activity of a similar catalyst produced from a silica gel, dried in accordance with standard tray drying procedure, wherein heated air is passed through tray supported hydrogel layers. Catalyst activity referred to herein is rated according to the volume of polymer liquid produced, collected at 0° C., when pure propylene is passed over a portion of the catalyst granules under standardized conditions of temperature, pressure and flow rate.

I have designed and developed a vessel in which uniform drying of hydrogels may be obtained which overcomes the disadvantages of tray drying, and which reduces the time and manpower requirements ordinarily expended.

Various embodiments of my invention may be practiced. Fundamentally the drier apparatus of this invention comprises a closed vertically disposed chamber containing heating surface disposed throughout the free volume of the chamber so as to transfer heat to the hydrogel being dried, in a manner to promote even drying and to produce a uniformly dried gel product. The upper 65 to 80 per cent of the free volume of the chamber, more preferably 65–75 per cent, comprises an upper section, the remainder of the free volume comprising the lower section. The chamber is provided with means for introducing hydrogel to be dried, means for withdrawing water vapor removed from the hydrogel and means for withdrawing gel product. Heating surface is disposed throughout the upper section of the chamber to provide one square inch of heating surface per 3.5 to 5 cubic inches of free volume in that section. The lower section of the chamber contains at least 35 per cent of the total heating surface disposed in the entire chamber, preferably from 40–60 per cent. In the lower section, preferably one square inch of heating surface is provided per 1.25 to 1.75 cubic inches of chamber volume. For the best results, it is usually preferable to have a uniform distribution of heating surface throughout each section of the chamber, although it will usually be impracticable to have absolutely uniform distribution because of construction problems.

Figure 2:
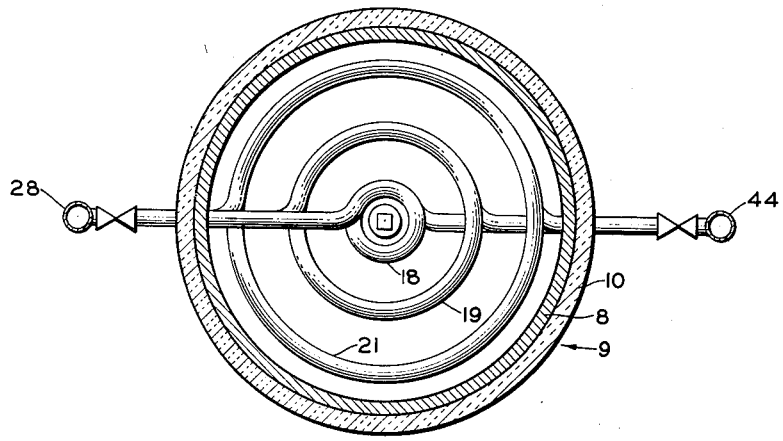
Figure 3:
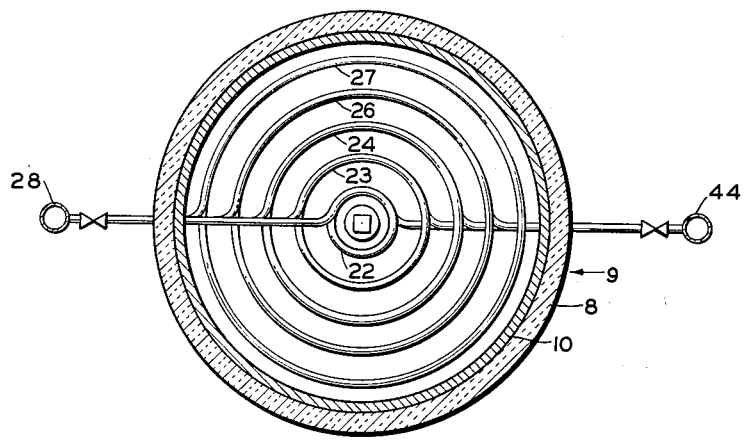
Figure 4:
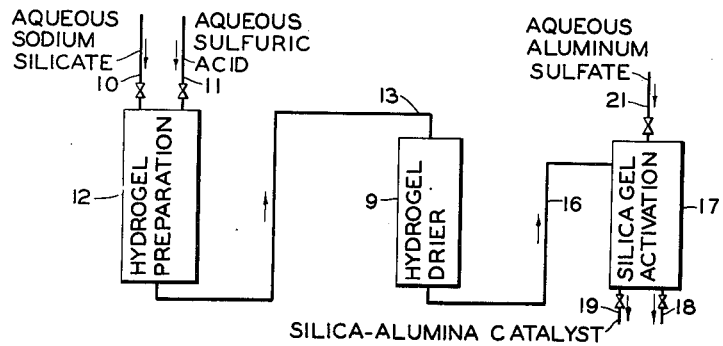

To understand more fully the process and apparatus of my invention, reference may be had to the attached drawings which diagrammatically illustrate my invention. Figure 1 is an elevation in section of a preferred apparatus. Figure 2 is a section taken at 2—2 in Figure 1 showing a preferred arrangement of heating coils in the upper section of the drying chamber. Figure 3 is a section taken at 3—3 of Figure 1 showing a preferred arrangement of heating coils smaller in size and more numerous than those of Figure 2 positioned in the lower section of the drying chamber. Figure 4 is a flow diagram by means of which I have illustrated an application of my invention in conjunction with generally accepted and well known procedure for the manufacture of silica-alumina type catalysts.

Referring to Figure 1, drying chamber 9 is formed by a vertically extending outer shell 10 having a flanged removable top closure member 14 and an inverted conical bottom closure member 12, and is insulated by suitable insulating material 8, such as magnesia. Hydrogel inlet 17 to chamber 9 is positioned in top closure member 14, preferably axially, and extends therethrough to permit flow of hydrogel to chamber 9. A set of helical coil 18, 19 and 21 is located in the upper section of chamber 9. Each of the coils 18, 19 and 21 has substantially the same number of turns per unit of vertical length, or the same lead, and are substantially equally spaced horizontally from the other, with coil 21 being positioned in close proximity to the inner wall of shell 10.

A second set of helical coils comprising coils 22, 23, 24, 26 and 27 is disposed in the lower section of chamber 9, extending upwards from the lower portion of closure member 12. The coils in the lower set are arranged similarly to those of the upper set except that they are more numerous and of smaller size. In the lower set of coils, innermost coil 22 terminates nearest the apex of conical member 12 and coils 23, 24, 26 and 27 each terminate at progressively increased distances upward from the apex of closure 12.

Header 28 supplies steam, at any selected pressure, or any other suitable heating medium, to any or all coils in either the upper or lower set. Steam is passed from header 28 to coils 18, 19 and 21 through valved steam inlets 31, 32 and 33, respectively, and to coils 22, 23, 24, 26 and 27 through valve inlets 39, 38, 37, 36 and 34, respectively. Steam may be passed through any one or all of the coils in either or both sets. Condensate is discharged from coils 18, 19 and 21 through valved outlets 41, 42 and 43, respectively, to header 44 and from coils 22, 23, 24, 26 and 27 to header 44 through valved outlets 51, 49, 48, 47 and 46, respectively. Condensate from header 44 is passed through steam trap 52. Vapor outlet 54 is positioned in the upper portion of shell 10 and extends therethrough into communication with chamber 9. Bottom closure member 12 is closed at the apex, by flanged member 7, which is separable therefrom at flange 6. Valved outlet 13 is positioned axially in flanged member 7 and extends therethrough into communication with chamber 9. Core baffle 25 is positioned within heating coil 22, which is the coil of least diameter in the lower set, in order to maintain the desired ratio of free chamber volume to heating surface area in the lower portion of chamber 9. If desired, an auxiliary steam coil of the hairpin type might be vertically disposed in the lower portion of the drying chamber in the place of core baffle 25.

The number of coils required in each portion of the drying chamber is dependent upon the actual volume of each portion of the chamber, after providing a free space or clearance above the top of the coils, or between the coils and closure member 14. The heating coils are arranged, as already described, to distribute the heating surface throughout the remaining free area of the chamber. The lower section of the chamber comprises approximately 25–35 per cent of the total chamber volume and the upper section of the chamber comprises from 65–75 per cent of the total volume. In the lower section one square inch of heating surface is preferably provided for each 1.25–1.75 cubic inches of lower portion chamber volume. The amount of heating surface may be decreased further so that one square inch is provided for about 3 cubic inches, but the drying time will increase substantially and a small amount of incompletely dried gel will result. In the upper section, one square inch of heating surface is preferably provided for each 3.5 to 5 cubic inches of upper portion chamber volume. In carrying out the preferred embodiment of my process, the hydrogel, prepared in accordance with well-known procedure, such as that described, and containing from 75 to 90 per cent water, is introduced to drying chamber 9 through hydrogel inlet 17, or by first removing top closure member 14 at flange 16, as described. Hydrogel may be introduced to chamber 9 by any one of a number of different methods. For instance, granules of hydrogel suspended in water may be pumped through inlet 17. If desired, hydrogel may be transferred to chamber 9 in lumps and admitted into the chamber by removing the top closure member. In any case, hydrogel is introduced to chamber 9 through either inlet 17 or by removal of top closure member 14. Chamber 9 is filled to a level above the upper set of coils. Any free-flowing water introduced with the hydrogel to drying chamber 9 is withdrawn from the chamber through valved outlet 13. Steam from header 28 is then passed through each of the coils in each set, illustrated in the figure, and the hydrogel is gradually heated to a temperature preferably in the range of 300 to 400° F. If desired, steam may be passed through each set of coils at a minimum temperature, such as about 200° F., and thereafter at progressively increasing temperatures until the maximum of about 400° F. is reached. It is sometimes advantageous to gradually increase the temperature at a rate such that the maximum is reached at about the end of the drying period. The hydrogel upon being heated liberates water as water vapor, which is withdrawn from chamber 9 through outlet 54, condensed in water cooled condenser 56 and passed through line 57 to calibrated receiver 58. Through vacuum line 59, connected to receiver 58, and in communication with chamber 9, a pressure in chamber 9 is maintained preferably between about 18 to 24 inches vacuum. However, pressures up to one atmosphere may be employed without seriously extending the duration of the drying period or impairing the quality of the gel. During the heating of the hydrogel in chamber 9, water is liberated and the volume of hydrogel decreases so that after only 4 to 10 hours the remaining gel occupies the lower section of chamber 9 only, in contact with coils 22, 23, 24, 26 and 27. The final drying, taking place in the presence of smaller coils, is even and uniform due to the relatively low ratio of free space to the heating surface area maintained therein.

Subsequent to collecting water in receiver 58 in an amount of about 80 to 85 per cent of the weight of hydrogel initially charged, heating is discontinued and uniformly dry product gel of high quality for subsequent activation, is withdrawn from chamber 19 through an opening formed by removing flange member 7.

Although the preferred embodiment of this invention has been described as a batch operation, it is to be understood that when employing a plurality of chambers 9 as illustrated in Figure 1, a drying process of my invention may be incorporated in any continuous catalyst preparation process by operating in predetermined cycles.

In the practice of my invention, a great saving in time and labor requirements is effected since no trays need to be loaded manually, nor is it necessary to manually rake or stir hydrogel being dried.

With reference to Figure 4, I have diagrammatically illustrated my invention as applied in conjunction with generally accepted and well known procedure for the manufacture of "silica-alumina"' type catalyst. Obviously various modifications can be made or followed and yet remain within the intended scope of my invention. Referring to Figure 4, aqueous sodium silicate having a gravity in the range of from 15 to 28° Baumé from line 10 is mixed in hydrogel preparation zone 12 by being added to aqueous sulfuric acid from line 11, having a gravity within the limits of 15 to 25° Baumé, in a volume ratio to the acid of about 1:1 although concentrations within a wider range of the silicate and acid in the resulting mixture may sometimes be advantageously employed, and are permissible as discussed earlier in this specification. The resulting mixture is retained in zone 12 and allowed to set therein to form a hydrogel, usually within from 2 to 12 hours. The hydrogen is then allowed to age in zone 12 for a period from 2 to 24 hours, and is washed therein to remove excess salt and/or acid. Washing is repeated until the wash water has risen to a pH of from 2 to 3. The hydrogel thus prepared in zone 12 is passed through line 13 to hydrogel drier 9, of this invention, diagrammatically illustrated in detail in Figure 1, wherein any excess water is drained from the fresh hydrogel and remaining water is removed in accordance with the procedure already discussed in this specification. Gel product, containing usually from 10 to 15 per cent water, is passed from drier 9 to activation zone 17 through line 16 wherein it is maintained in admixture with aqueous aluminum sulfate containing usually from 15 to 25 per cent by weight of aluminum sulfate. Spent aluminum sulfate is removed from zone 17 through line 18 and the activated gel is water washed in zone 17 to a pH generally within the limits of 3 to 4. Activation and washing steps may be repeated if desired. Washed activated gel is dried in zone 17 to a moisture content within the range of 5 to 9 per cent by weight, and the dried finished silica-alumina catalyst is withdrawn from zone 17 through line 19.

For convenience and clarity certain apparatus such as pumps, surge tanks, accumulators, valves, etc., have not been shown in the drawings. Obviously such modifications of the present invention may be practiced without departing from the scope of the invention.

Although the vertically disposed drying chamber of my invention is preferably cylindrical it may be of square cross section, or of cross section of any desired shape; and although the bottom closure member of the drying chamber is preferably conical, to facilitate discharge of gel product, as illustrated, any closure member of suitable shape may be employed. Heating surface may be in the form of pipe coils in various designs other than the preferred helical coils illustrated in Figure 1. If desired, for example, vertical pipes may be employed, or a hair pin bundle may be utilized to provide the proper distribution and amount of heating surface. When employing pipe coils, various heat transfer media, such as any hot gas, steam or hot liquid, may be employed. Heating surface may be formed from electrical elements or coils.

My invention will be further illustrated and defined by the following examples. The reactants and their proportions and other specific ingredients are presented as being typical and should not be construed to limit the invention unduly.

*Example 1*

A known weight of silicic acid gel of the type prepared in accordance with the procedure already described in the specification, containing from 88–90 per cent water, was passed into a hydrogel drier apparatus of this invention, of the type illustrated in Figure 1. Three steam heating coils made of ½" pipe were uniformly positioned in the upper 76.1 per cent portion of the enclosed chamber, such that the free volume in the upper portion of the chamber was 4.14 cubic inches per square inch of heating surface. In the lower 23.9 per cent portion of the enclosed chamber, 5 heating coils made of ¼" pipe were uniformly positioned. The free volume of the lower portion of the chamber was 1.57 cubic inches per square inch of heating surface.

Excess water present in the freshly charged hydrogel was drained from the hydrogel body through an outlet in the bottom of the inverted conical closure member. Saturated steam at 190 p. s. i. g. was then passed through both sets of heating coils and the temperature of the hydrogel was gradually raised to a level of about 385° F. The system was maintained at atmospheric pressure, and as the temperature of the hydrogel gradually increased, water was removed from it as vapor, which was withdrawn from the hydrogel body through an outlet in the top of the drying chamber, and condensed and collected in a calibrated receiver. The hydrogel while liberating water, decreased in volume and continued to shrink until it occupied the lower 23.9 per cent portion, only, of the drier chamber. During a major portion of the drying period the hydrogel was maintained at the maximum temperature level. The hydrogel occupying the lower portion, only, of the chamber contained from about 20 to 30 per cent water. The remaining water to be removed from the gel was thus removed with the gel in contact only with the smaller and more closely spaced coils in the lower portion. Liberation of water vapor during these latter stages was not rapid, as was the case in the earlier stages of the drying when a portion of the hydrogel was in contact with the ½″ tubes. However, due to the lowered ratio of chamber volume to heating surface, and the uniformly positioned relatively small heating tubes in the lower portion of the chamber, heating was continued at the same temperature until 81 per cent by weight of the hydrogel charged was removed as water, as measured by the calibrated receiver. The heating was thereafter discontinued and the dried gel removed from the chamber through an opening provided in the bottom of the inverted closure member. The gel was evenly dried; no over-drying and/or under-drying was observed. The duration of the entire drying step was 16 hours.

*Example 2*

A batch of the fresh hydrogel of Example 1 was dried exactly as described therein, except that 40 p. s. i. g. saturated steam was employed as a heating medium instead of 190 p. s. i. g. saturated steam. The duration of the entire drying step was 47.5 hours.

*Example 3*

The procedure of Example 1 was repeated except that instead of operating at atmospheric pressure the drier was operated at subatmospheric pressure during the entire run. The vacuum on the chamber was 18″ at the start of the run and reached 24″ at the end of the run. The catalyst when removed was evenly dried; no over-drying and/or under-drying was observed. The duration of the entire drying step was 11.5 hours.

*Example 4*

Fresh hydrogel of Example 1 was dried in a hydrogel drier having a system of four ½″ heating coils, three of which were uniformly spaced in the portion of the drier above the conical closure member. The fourth coil was a spiral cone resting inside the conical closure member. The ratio of the cubic inch volume of the drier to the square inch heating surface of the coils was 4.33. 190 p. s. i. g. steam was passed through the coils during the drying step. Pressure was built up in the vessel to 50 p. s. i. g. and then gradually reduced or "bled" to 30 p. s. i. g., and repressured up to 60 p. s. i. g. It was then bled down to 18 p. s. i. g. and repressured up to 60 p. s. i. g. The take-off valve was then opened and the pressure was allowed to decrease to one atmosphere. Eighty per cent by weight of water was removed from the hydrogel. The duration of the entire drying step was 24 hours.

Another portion of the fresh hydrogel of Example 1 was dried, employing 190 p. s. i. g. steam, in the apparatus of Example 1, containing the smaller and more closely spaced coils in the bottom portion of the chamber. The vessel was pressured to 150 p. s. i. g., and bled down to 90 p. s. i. g. and again pressured to 150 p. s. i. g. This procedure was repeated as long as the pressure readily built up in the chamber. The take-off valve was then opened and the pressure allowed to decrease to one atmosphere. The duration of the entire drying step was 11 hours.

When thus operating the drying step, first under relatively high pressure and then at a relatively lower pressure with a consequent increased rate of water take-off, an excessive amount of fine material was produced, which obviously was an undesirable feature. The best grain size is produced when the pressure in the drier is not allowed to exceed one atmosphere.

*Example 5*

Another portion of fresh hydrogel of Example 1 was dried in the drying apparatus of Example 2. The chamber was operated alternately at increased and decreased pressures until pressure was no longer readily built up. When the chamber pressure finally reached one atmosphere, heated air was passed through the hydrogel, and water was driven from the hydrogel until about 80 per cent by weight had been removed. Thereafter the heating was discontinued and the dried gel removed from the apparatus. The major portion of the hydrogel was over-dried, and a part of it was still soft, although of a dark color. The duration of the run was 9 hours.

*Example 6*

A sample of the hydrogel dried in accordance with the procedure of Example 3, and a sample of ordinary tray-dried hydrogel, i. e., hydrogel disposed on tray supported layers and dried by passing heated air upwardly therethrough, were washed alike and activated together. The catalyst prepared from the hydrogel dried in accordance with Example 3 had an activity in excess of 180 per cent of the activity of the catalyst prepared from the tray-dried hydrogel.

From the foregoing examples it is seen that passing heated air through a body of hydrogel in a drying chamber effects the drying process in a relatively short length of time. However, when employing heated air as illustrated in Example 5, severe over-drying and under-drying takes place and consequently a catalyst of relatively low activity is ultimately obtained.

The examples illustrate that when employing an apparatus of my invention, a hydrogel may be uniformly dried at atmospheric and subatmospheric pressures and at a temperature in the range of from 300–400° F., and that such a drying operation may be conducted with a great saving in time and manpower requirements.

As demonstrated by Examples 1 and 3, the drying time may be shortened considerably by placing a vacuum on the hydrogel during the drying operation. For example, the time required to remove 80 per cent by weight water from the gel was reduced from 16 to 11.5 hours by the use of a vacuum.

The required drying time for uniformly drying a hydrogel in accordance with my invention is greatly reduced by using higher temperature steam. As illustrated by Examples 1 and 2, the time required for drying a given hydrogel when using 190 pounds p. s. i. g. saturated steam was 16.5 hours, but when employing 40 p. s. i. g. of saturated steam the required time was 47.5 hours.

As will be evident to those skilled in the art, various modifications of this invention can be made, or followed, in the light of the foregoing disclosure and discussion, without departing from the spirit or scope of the disclosure or from the scope of the claims.

I claim:

1. An apparatus for drying a hydrogel comprising a vertically disposed chamber having an upper and lower closure member, means for introducing hydrogel into said chamber, means for withdrawing water vapor from the upper portion of said chamber, and means for withdrawing gel product from the lower portion of said chamber; a first portion of said chamber comprising the upper 65-75 per cent of the free volume of said chamber, a second portion of said chamber comprising the lower and remaining portion of the free volume of said chamber, a heating surface uniformly disposed throughout said first portion and said second portion, the ratio of heating surface in said second portion being from 35 to 60 per cent of the total heating surface in said chamber and uniformly disposed in said second portion to provide one square inch of heating surface per 1.25 to 1.75 cubic inches of free volume therein.

2. The apparatus of claim 1 wherein said heating surface is disposed throughout said upper section so as to provide one square inch of heating surface per 3.5 to 5 cubic inches of free volume of said upper section.

3. In an apparatus for drying hydrogel, a closed vertically disposed chamber, means for introducing hydrogel to said chamber, means for withdrawing a dried gel product from said chamber, outlet means for withdrawing said vapor formed in said chamber, heating means adapted to provide uniform heating of hydrogel within said chamber whereby said hydrogel is dried uniformly to a predetemined degree and water is removed from said hydrogel as vapor, comprising a set of heating coils in the upper section of said chamber and a separate set of heating coils in the lower section thereof, said upper set of coils comprising a pluraltiy of helical coils concentric with respect to the vertical axis of said chamber, and disposed throughout the free volume of said upper section to provide one square inch of heating surface per 3.5 to 5 cubic inches of free space within said upper section, said lower set of coils being similar to said upper set but greater in number and smaller in cross section and disposed throughout the free volume of said lower section to provide one square inch of heating surface per 1.25 to 1.75 cubic inches of free space within said lower section, whereby after part of the water of the hydrogel is removed and the gel shrinks in the lower portion of said chamber the remaining portion of water to be removed from said hydrogel is removed therefrom without unevenly heating and unevenly drying said gel, separate inlet means to coils of each said set for admitting heat medium, and separate outlet means from coils of each said set for discharging heating medium.

4. In an apparatus for drying hydrogel, a drying chamber comprising a vertically disposed insulated cylindrical shell having a top closure member and an inverted conical bottom closure member, inlet means in said top closure member for admitting hydrogel, outlet means in the lower portion of said conical closure member for discharging gel product, heating means described hereafter adapted to provide uniform heating of hydrogel throughout said chamber whereby said hydrogel is dried uniformly to a predetermined degree and water is driven from said hydrogel as vapor, outlet means in the upper portion of said chamber for withdrawing said vapor, said heating means comprising a set of heating coils in the upper 65-75 per cent section of said chamber, a separate set of coils in the lower 25-35 per cent section thereof, said upper set of coils comprising a plurality of helical coils disposed throughout the free volume of said upper section to provide one square inch of heating surface per 3.5 to 5 cubic inches of free space within said upper section, said lower set of coils being similar to said upper set but greater in number and each of smaller tubing and disposed throughout the free volume of said lower section to provide one square inch of heating furnace per 1.25 to 1.75 cubic inches of free space within said lower section whereby the total heating surface in said lower section comprises from 40-60 per cent of the total heating surface in said chamber and after part of the water of the hydrogel is removed and the gel shrinks into the lower portion of said chamber the remaining portion of water to be removed from said hydrogel is removed therefrom without unevenly heating and unevenly drying said hydrogel, at least a portion of said lower set of coils being disposed inside said conical member whereby the innermost coil thereof is of the greater length and the outermost coil is the shortest, water outlet means in the lower portion of said conical member whereby any free water introduced with hydrogel to said chamber may be drained, separate inlet means to coils of each said set for admitting steam, and separate outlet means from coils of said set for discharging condensate.

5. The method of drying a hydrogel which comprises heating said hydrogel in a vertically disposed cylindrical drying zone in indirect heat exchange relation with a heating medium moving through the upper 65 to 75 per cent of said zone in a plurality of spiral paths axially and uniformly disposed throughout said upper portion to provide one square inch of heating surface per 3.5 to 5 cubic inches of free space therein and through the lower and remaining portion of said zone through similarly disposed spiral paths but narrower and greater in number to provide one square inch of heating surface therein per 1.25 to 1.75 cubic inches of free volume, said hydrogel containing water in a proportion exceeding 85 per cent of its total weight prior to said heating and while being heated liberating water as vapor and shrinking into said second portion, withdrawing water vapor from said drying zone in an amount equivalent to from 80 to 85 per cent of the weight of hydrogel prior to said heating, and recovering gel product from said drying zone.

6. The process of claim 5 wherein steam is employed in said heat exchange at a temperature in the range of 200 to 400° F.

7. The process of claim 6 wherein the temperature of said steam is progressively increased from 200 to 400° F. during drying duration.

8. The method of drying a hydrogel which comprises initially heating said hydrogel in a vertically disposed cylindrical drying zone in contact with heating surface uniformly disposed throughout the upper 65 to 75 per cent portion of said zone in an amount to provide one square inch of heating surface for each 3.5 to 5 cubic inches of free space within said upper portion while in contact in the lower and remaining portion of said drying zone with heating surface uniformly disposed therein in an amount to provide one square inch of heating surface for each 1.25 to 1.75 cubic inches of free space, said hydrogel containing more than 85 per cent by weight of water prior to said heating and liberating water as vapor while being heated and shrinking into said lower portion during said heating, withdrawing water vapor from said drying zone in an amount equivalent to from 80 to 85 per cent of the weight of hydrogel prior to said heating, and recovering gel product from said lower portion as a product of the process.

9. The process of claim 8 wherein from 82 to 83 per cent of the weight of the hydrogel prior to said heating, is removed as water vapor.

BRUCE M. BAIRD.

REFERENCES CITED

The following references are of record in the file of this patent:

UNITED STATES PATENTS

| Number | Name | Date |
| --- | --- | --- |
| 1,134,762 | Schaffer | Apr. 6, 1915 |
| 1,863,803 | Pantenburg | June 21, 1932 |
| 1,920,107 | Richardson | July 25, 1933 |
| 1,949,427 | McComb | Mar. 6, 1934 |
| 2,249,583 | Thomas | July 15, 1941 |
| 2,270,090 | Thomas | Jan. 13, 1942 |
| 2,273,350 | Fry et al. | Feb. 17, 1942 |
| 2,470,142 | Chapman | May 17, 1949 |